(12) United States Patent
Schuetzle et al.

(10) Patent No.: US 8,394,862 B1
(45) Date of Patent: Mar. 12, 2013

(54) CATALYTIC PROCESS FOR THE DIRECT PRODUCTION OF HYDROCARBON FUELS FROM SYNGAS

(75) Inventors: Robert Schuetzle, Sacramento, CA (US); Dennis Schuetzle, Grass Valley, CA (US); David De Villiers, Rocklin, CA (US)

(73) Assignee: Pacific Renewable Fuels, Inc., McClellan, CA (US)

( * ) Notice: Subject to any disclaimer, the term of this patent is extended or adjusted under 35 U.S.C. 154(b) by 366 days.

(21) Appl. No.: 12/927,242

(22) Filed: Nov. 10, 2010

(51) Int. Cl.
*C07C 27/00* (2006.01)
(52) U.S. Cl. ......... 518/700; 518/715; 518/719; 518/720
(58) Field of Classification Search .................. 518/700, 518/715, 719, 720
See application file for complete search history.

(56) References Cited

U.S. PATENT DOCUMENTS

| | | | |
|---|---|---|---|
| 4,199,523 A * | 4/1980 | Rottig | 518/706 |
| 4,499,209 A | 2/1985 | Hoek et al. | |
| 5,620,670 A | 4/1997 | Benham et al. | |
| 6,262,131 B1 | 7/2001 | Arcuri et al. | |
| 2006/0130394 A1 * | 6/2006 | Selvidge et al. | 44/326 |
| 2012/0108682 A1 * | 5/2012 | Saxton et al. | 518/707 |

* cited by examiner

Primary Examiner — Jafar Parsa
(74) Attorney, Agent, or Firm — Jeffrey A. McKinney; McKinney Law Group

(57) ABSTRACT

A unique process and catalyst is described that operates efficiently at low pressures for the direct production of a high cetane diesel type fuel or diesel type blending stock from stoichiometric mixtures of hydrogen and carbon monoxide. This invention allows for, but is not limited to, the economical and efficient production high quality diesel type fuels from small or distributed fuel production plants that have an annual production capacity of less than 100 million gallons per year by eliminating traditional hydrocracking and other costly upgrading processes. This catalytic process is ideal for distributed diesel fuel production plants such as biomass to fuel production plants and stranded natural gas to diesel fuel production plants, and other applications that require optimized economics based on supporting distributed feedstock resources.

24 Claims, 5 Drawing Sheets

CATALYTIC PROCESS FOR THE DIRECT PRODUCTION OF HYDROCARBON FUELS FROM SYNGAS

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

1. Field of the Invention

This invention pertains generally to a unique catalyst and associated catalytic processes that operate at low pressures, for the direct, efficient production of high quality diesel-type fuels. These diesel-type fuels have a high cetane number, good lubricity, and almost no sulfur which are ideal as either a neat fuel, as a blend with current diesel-type fuel stocks for use in light and heavy duty diesel vehicles, as aviation fuels, in off-road diesel vehicles, in emerging gasoline direct injection engines, and in other applications.

More particularly, the present invention pertains to catalytic processes that allow for the elimination of costly and complex hydrocracking or other product upgrading steps, commonly employed in traditional Fischer Tropsch (F-T) processes, thus enabling the economical production of diesel fuel or diesel fuel blending stocks from distributed production plants that typically produce less than 100 million gallons per year of fuel, although much larger plants can use these processes. Examples of such distributed production plants include biomass or biogas to diesel fuel production plants, stranded natural gas to diesel fuel production plants, carbon dioxide to diesel fuel production plants, and other remote or mobile applications.

2. Description of Related Art

Global demand for energy continues to rise at a significant rate, particularly among developing industrialized nations. Natural gas, biomass, and other alternative resources, such as stranded natural gas, are becoming more attractive as energy sources due to increasing energy costs as well as for environmental reasons.

It is known in the art that biomass can be converted into syngas from a variety of known thermochemical conversion methods, including gasification and other methods. Coal or other carbonaceous solids can also be converted to syngas using gasification and other methods. Natural gas, carbon dioxide, biogas and other gases can also be converted into syngas using a variety of known reforming methods including steam methane reforming, dry reforming, autothermal reforming, and other methods that are known in the art. Technologies for the production of syngas from other carbonaceous resources are also widely known and emerging processes are also under development.

The catalytic hydrogenation of carbon monoxide to produce light gases, liquids and waxes, ranging from methane to heavy hydrocarbons ($C_{80}$ and higher) in addition to oxygenated hydrocarbons, is typically referred to Fischer-Tropsch (or F-T) synthesis. Traditional F-T processes primarily produce a high weight (or wt. %) F-T wax ($C_{25}$ and higher) from the catalytic conversion process. These F-T waxes are then hydrocracked and/or further processed to produce diesel, naphtha, and other fractions. During this hydrocracking process, light hydrocarbons are also produced, which may require additional upgrading to produce viable products. Some of these processes are known and described in the art.

For example, U.S. Pat. No. 6,262,131 B1 (Syntroleum), issued Jul. 17, 2001, describes a structured Fischer-Tropsch catalyst system and method that includes at least one structure having a catalytic surface, such catalytic surface having a linear dimension exceeding 20 mm, a void ratio exceeding 0.6, and a contour that causes non-Taylor flow when CO and $H_2$ pass through the structure. F-T catalysts, including iron and cobalt, are described in the patent.

U.S. Pat. No. 4,499,209 (Shell Oil Company), issued Feb. 12, 1985, describes a Fischer-Tropsch catalyst prepared by impregnation of a silica carrier with a solution of zirconium and titanium, followed by calcination and other preparation steps.

U.S. Pat. No. 5,620,670 (Rentech, Inc.), issued Apr. 15, 1997, describes a catalytic process converting hydrogen and carbon monoxide in a Fischer-Tropsch synthesis reactor using a promoted iron oxide catalyst slurry.

These patents describe catalysts that form high hydrocarbon reaction products (e.g., wax) that require further processing, including hydro-processing and other upgrading processes, to produce diesel fuel or diesel blendstock ($C_8$-$C_{24}$).

Hydrocracking and other upgrading processes add significant expense and complexity to a plant design. Such processes can be justified for large, refinery scale plants. However for smaller, distributed applications such as biomass-to-liquids (BTL), gas-to-liquids (GTL), and other plants that produce less than 100 million gallons of fuel per year, plant designs that incorporate traditional F-T processes that include hydrocracking and other expensive upgrading processes may not be economically viable.

To date, F-T type catalyst and catalytic process plant designs have not been available to support these smaller, distributed applications that allow for the direct production of diesel type fuels.

Accordingly, there is an increasing need for a catalytic process that can directly convert syngas into a diesel fuel with a high yield at relatively low cost under mild operating conditions. There is also a need for a catalytic process that does not require traditional hydrocracking and upgrading steps, thus enabling the economic production of BTL, GTL, and other types of plants that produce less than 100 million gallons of product per year. The present invention meets these needs as well as others and provides a substantial improvement over the prior art.

BRIEF SUMMARY OF THE INVENTION

Embodiments of the present invention provide a catalytic process using a supported catalyst to directly produce a diesel fuel from syngas at high yields, where the catalytic process produces the diesel fuel and wax at a ratio of greater than about 5 to 1 by weight. Traditional F-T processes before hydroprocessing or upgrading produce a majority of wax and only a small amount or no diesel fuel. Thus, producing a product fraction with a ratio of greater than 5 to 1 diesel fuel to wax, without hydroprocessing or other upgrading steps, requires a significantly different catalyst and process than has been used in the past.

Typical raw products of F-T synthesis include a majority of waxes, and are hydroprocessed to reduce boiling point. As part of this process hydroprocessing removes oxygenates and olefins produced during the process by converting them to corresponding paraffins.

The complete removal of oxygenates including high molecular weight linear alcohols is undesirable since these alcohols provide good lubricity properties.

Using the supported catalyst described herein which operates at low pressures (e.g., below about 250 psi), the catalytic process can produce the diesel fuel and wax at a ratio between about 5 to 1 and about 30 to 1 by weight. Embodiments of the invention provide desirable combinations of variables to produce a process and catalysts that produce a high diesel fraction yield directly from syngas.

This diesel fuel fraction may also be blended with hydroprocessed fuels that are produced from the wax fraction from this process or other F-T processes.

A variety of catalyst parameters of the supported catalyst makes it unique and allows for efficient operation at low pressures. Structural parameters include support material ($Al_2O_3$, $SiO_2$, etc.), size, shape (cylinder, tri-lobe, etc.), pore diameter, surface area, crush strength, effective pellet radius, and other parameters as described herein.

A unique combination of these parameters provides for an effective catalyst that produces high diesel fuel to wax ratios and operate at low pressures. Procedures for the reduction of the catalyst and the type of reactor used in the process are also important factors that determine selectivity to product.

As has been shown through experimental and pilot plant work, variations of the parameters mentioned above can have a dramatic effect on product distribution in some embodiments. For example, finding the optimal pore diameter, surface area, crush strength, and effective pellet radius of a supported catalyst for low pressure operation can change the product distribution and can make a difference between an economical distributed plant (producing less than 100 million gallons of product per year) and one that requires expensive upgrading processes. Further, the reduction procedures and type of reactor used in the process are integral to obtaining the desired yields.

In one aspect of the invention, the process comprises reacting a feed gas (e.g., syngas, cleaned up syngas, and others) with a supported catalyst to produce a product stream comprising light gases, diesel fuel and a wax, wherein a ratio of the diesel fuel to wax in the product stream is greater than about 5 to 1 by weight.

In embodiments of the invention, the metal catalyst may be cobalt, iron, nickel, or a combination of these metals deposited at greater than 5 weight percent (wt. %) on gamma alumina, silica, or another support material along with one or more promoters at about 0.01 wt. % to about 2 wt. %, based on the total weight of the supported catalyst.

The promoters may include one or more of the following: ruthenium, rhenium, palladium, platinum, rhenium, gold, nickel, rhodium, osmium, or iridium. Structural parameters of the support require that the catalyst has a mean pore diameter greater than 10 nm. The catalyst may be a lobed extrudate (e.g., quad-lobe or tri-lobe), a sphere, granule, or other shape that allows for efficient operation in a catalyst bed. Ideally, the lobed support is a quad-lobe consisting of four lobes with two lobes being longer and the other two shorter, with both the longer lobes being symmetric and the shorter lobes being symmetric.

The distance from the mid-point of the support or the mid-point of each lobe is called the "effective pellet radius".

Production methods of the catalyst include impregnation and other methods of production commonly used in the industry and are described in the art.

The catalyst support used has an average pore diameter greater than about 120 angstroms, a mean effective pellet radius less than 600 microns, a crush strength of greater than 3 lbs/mm, and a BET surface area of greater than 150 $m^2/g$. This combination of variables is unique.

Conventional high surface area catalyst supports have an average pore diameter less than 100 angstroms. Supports that have been engineered to have an average pore volume greater than 40 cc/g or an average pore diameter greater than 120 angstroms will have surface area much lower than 150 $m^2/g$ and crush strength will be below 2 lbs/mm. Achieving the above combination of variables is unique in the art (i.e. the unique combination of high surface area, large pore volume and pore diameter, and sufficient crush strength). To ensure a crush strength as high as 2 lbs/mm, the carrier would have to be calcined at very high temperatures (>1,800 F) at the expense of losing substantial surface area.

It has been discovered that the supported catalyst in accordance with the present invention, when used in a fixed bed reactor and using a unique in-situ reduction process is very effective at low pressures and produces a high selectivity to diesel type fuel product and results in a diesel fuel to wax ratio between about 5 to 1 and about 30 to 1 by weight. The operating pressure for F-T catalytic reaction is generally below 250 psi, preferably about 200 psi. Traditional F-T processes operate at 400 psi or higher.

The diesel fuel produced from the process in accordance with the present invention is ideal for blending with a petroleum diesel to improve its cetane content and to reduce sulfur in the blended fuel. The diesel fuel has lubricity ranging from 200 micron to 475 micron per ASTM D6079.

Another aspect of this invention is to separate the product produced from the catalytic reaction in a single condensation step, wherein the diesel fuel, water fraction, and wax fraction are all separated in a single knock out vessel. The small percentage of wax product will stay entrained in the water fraction ("wax/water fraction"), allowing for ease of separation of the diesel fuel fraction from the wax/water by products.

Yet another aspect of this invention is to contact the diesel fuel fraction with a second catalyst, such as a platinum-promoted catalyst, to conduct mild isomerization or mild hydrogenation of the diesel fuel. The isomerization or hydrogenation of the diesel fuel can improve cold flow of the product for sale in certain markets where improved cold flow properties may be required.

A further aspect of this invention is to splash blend the diesel fuel with a small percentage of cold flow improver such that it can meet specifications for neat fuel operation in cold climates.

BRIEF DESCRIPTION OF THE DRAWINGS

The invention will be more fully understood by reference to the following drawings which are for illustrative purposes only.

DETAILED DESCRIPTION OF THE INVENTION

Figure 1:
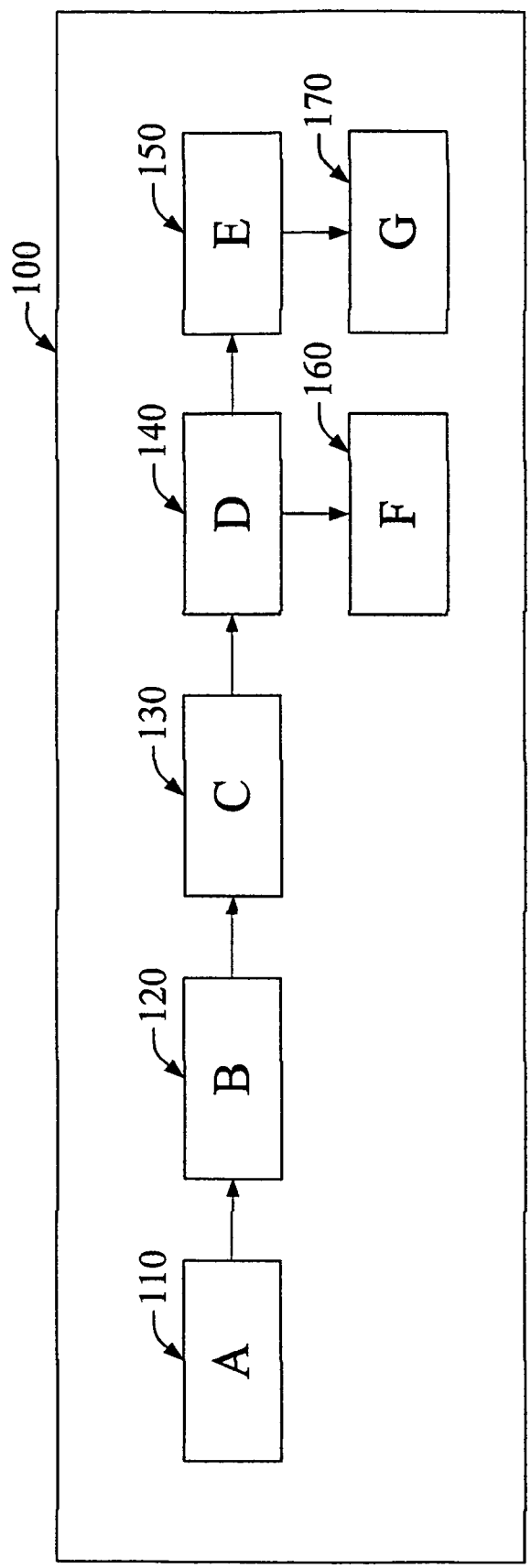
FIG. 1 shows a process flow diagram with Items A through E, each of which presents different process steps from the production of syngas to processing a diesel fuel.

Embodiments of the present invention provide a catalytic process that produces diesel type fuels (which include a majority of $C_8$-$C_{24}$ hydrocarbons) with high selectivity, while minimizing F-T wax (which includes a majority of $C_{24}^+$ hydrocarbons) production using a unique catalyst and process that operates at low pressures. Traditional F-T catalysts operate in the 400 psi-500 psi range, while embodiments of the present invention operate effectively below about 250 psi to achieve the optimal desired product selectivity. In this context, "selectivity" refers to moles of referenced fuel product formed per mole of CO converted.

In the preferred embodiment described herein, the product is a diesel type fuel or diesel type fuel blendstock consisting of majority of $C_8$-$C_{24}$ hydrocarbons and a minimal amount of wax ($C_{24}$+). Hereinafter, the diesel fuel or diesel blendstock fraction that consists of hydrocarbons with a majority in the $C_8$-$C_{24}$ range is referred to as "diesel fuel." A process in accordance with the present invention described herein produces a diesel fuel and wax at a ratio of between about 5:1 and about 30:1 by weight.

The product produced directly from the application of this invention is a high cetane diesel fuel having a diesel fuel to wax ratio of greater than 5 to 1 by weight. A traditional F-T product has a product distribution, where the ratio of diesel fuel to wax ratio is close to 1:1. Contrary to the traditional F-T product, in embodiments of the invention, the diesel fuel can be produced directly from syngas at high yields by passing the syngas through a F-T reactor in a single pass (without requiring hydrocracking or other additional processes). In other embodiments, unconverted syngas is recycled to the head of the reactor and blended with incoming feed gas.

The diesel fuel is liquid under ambient conditions (e.g., at 72° F. and atmospheric pressure). The liquid hydrocarbon product of the present catalytic reaction is more valuable than the traditional high wax product produced from F-T catalytic reaction since the product can be used directly as a diesel blending stock or as a neat fuel without a need to employ costly hydrocracking processes. When the diesel fuel is used as a blendstock, this will improve cetane number and reduce sulfur of typical petroleum derived diesel fuels. The blendstock also has superior lubricity properties. If the original feedstock from the syngas production is renewable, the blendstock may also provide a beneficial low carbon component when blended with petroleum derived fuels.

The diesel fuel produced from this process may also be blended with middle distillate or diesel fuels that are produced from hydroprocessing of F-T waxes.

In traditional F-T processes, following the catalytic production process, product fractions are separated using a series of condensers or "knock out vessels". For example, in other F-T process, a wax product is first condensed in a knock out vessel that is operated at 300° F.-380° F. The liquid and water fractions are then condensed out in a second vessel at or below ambient conditions (80° F. or below).

Embodiments of the invention also provide a unique process for an efficient separation of a diesel fuel fraction, wherein a single knock out vessel is used to condense out all of the liquid products and wherein a small amount of higher hydrocarbon wax stays entrained in the water fraction. The processes in accordance with the present invention provide maximization of the production of a diesel fuel fraction.

Embodiments of the invention provide several advantages. The diesel fuels produced in accordance with the present invention are ideal as current diesel fuel blend-stocks since such blending improves cetane number, lowers fuel sulfur content, and lowers engine emissions. The diesel fuel product can be used as a neat fuel, as a blend, or can either be mildly isomerized or splash blended with a cold flow improver to meet specifications for low temperature climates.

Furthermore, maximization of the $C_8$-$C_{24}$ selectivity for the diesel fuel fraction allows elimination of hydrocracking and other costly upgrading processes for this fuel fraction. Thus, embodiments of the present invention enable the economic production of distributed BTL and GTL plants that produce less than 100 million gallons of fuel per year.

Referring more specifically to the drawings, FIG. 1 illustrates a schematic flow diagram (100) with Items A (110) through E (150), each of which represents a different process step, starting with the production of a syngas feed to the processing of a diesel fuel.

In FIG. 1, Item A (110) refers to any process that produces a syngas feed, which may include biomass gasification, coal gasification, reformation of methane, reformation of methane and/or $CO_2$, reformation of biogas, and other processes well known in the art, as well as emerging processes that are being developed as economical ways to produce syngas from renewable, fossil, and other resources.

Item B (120) represents syngas cleanup and conditioning processes. Clean syngas free of impurities (which may affect catalyst performance and lifetime) is necessary for efficient and economical operation. Impurities may include hydrogen sulfide, ammonia, chlorides, and other contaminants that result from a syngas production process. Syngas cleanup processes are well known and described in the art. For example, syngas cleanup processes may include sulfur clean up catalysts, particulate filters, tar cracking, and other technologies to produce clean syngas for subsequent conversion to fuels or chemicals.

Item C (130) represents the conversion of syngas into a product gas stream which results in a product mixture containing F-T liquids, light gases, and F-T wax. The present invention relates to the catalyst used in this process step and the corresponding operating conditions required for efficient operation during this process step.

Item D (140) includes product separation processes whereby the liquid and wax products are condensed out of the product gas stream and the light gases are recycled back to the catalytic reactor and/or may be used for power production or other parasitic load requirements. Item D (140) may also include condensing out the product gas stream into a product mixture comprising diesel, water, and wax in a single knock out vessel wherein the wax stays entrained in the water fraction for ease of separation from the diesel fuel fraction.

Item E (150) represents an optional step, where the diesel fuel product steam is exposed to a platinum promoted mild isomerization catalyst under mild process conditions. This process step converts some n-paraffins in the $C_8$-$C_{24}$ fraction to iso-paraffins in order to improve cold flow properties of the diesel fuel which may be required in some market areas.

Item E (150) may also represent another optional step, where a small percentage of a cold flow improver is blended into the diesel fuel fraction in order to help cold flow properties of the fuel for use in cold climates.

Items F (160) and G (170) represent the processed diesel fuel.

In F-T synthesis which occurs in Item C, hydrocarbon product selectivity depends on diffusion, reaction, and convection processes occurring within the catalyst pellets (i.e., supported catalyst) and reactor. In embodiments of the invention, catalyst pellets or supported catalyst refer to a catalyst (which is typically a metal) dispersed on suitable support material or pellets. The characteristics of a supported catalyst that affect a product distribution (e.g., the proportion of a diesel fuel and wax) include structural parameters, such as an effective pellet radius and pore diameter of the support material, in addition to operating conditions of the catalyst.

Figure 2:
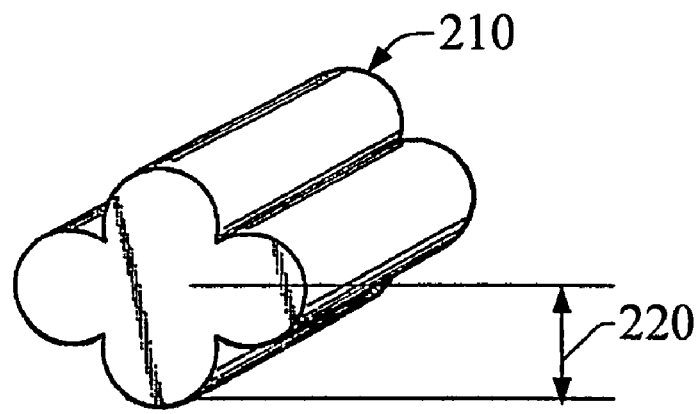
FIG. 2 shows the effective pellet radius of a quad-lobe and a spherical support and also shows a quad-lobe with different sized lobes.
Figure 2:
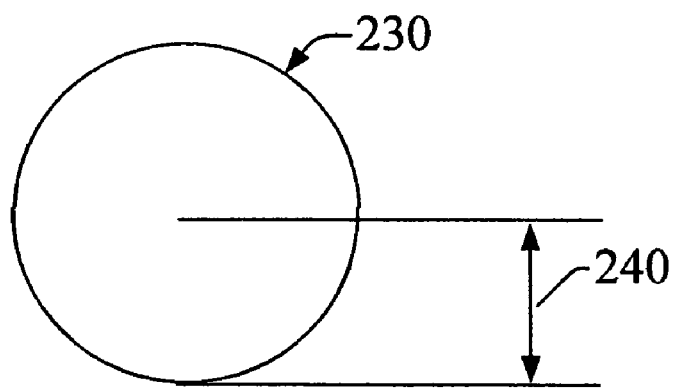
Figure 2:
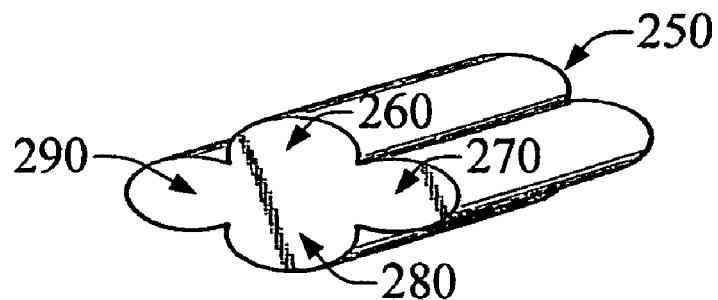

FIG. 2 illustrates examples of shapes of pellets (i.e., support or support materials) which may be used to support a catalyst in the F-T process which occurs in Item C. FIG. 2 shows a quad-lobe (210) and a spherical catalyst (230) which may be used in embodiments of the invention. Support material with other shapes may also be used. These include granules, tri-lobes, cylinders, and other shapes typically used in the art.

The catalyst shape is ideally an extrudate with a lobed, fluted, or vaned cross section but could also be a sphere, granule, powder, or other support shape that allows for efficient operation. The use of a lobed structure, for example, enables a significant increase in the ratio of area to volume in the catalytic reactor, thus improving the volumetric efficiency of a catalytic reactor system. The lobed structures also provide an improved pressure drop, which translates into a lower difference in the pressure upstream and downstream of the catalyst bed, especially when they are used in fixed bed reactors.

FIG. 2 also illustrates how the effective pellet radius of a support material is defined. The effective pellet radius of a pellet or support refers to the maximum radius which is a distance from the mid-point of the support to the surface of the support. For lobed supports, the effective pellet radius (220) refers to the minimum distance between the mid-point and the outer surface portion of the pellet as shown. (The effective pellet radius of a spherical support (230) is noted by 240.) In embodiments of the invention, the effective pellet radius may be about 600 microns or less. In one embodiment, the effective pellet radius may be about 300 microns or less.

In embodiments of the invention, the pellet or support material may be porous. The mean pore diameter of the support material may be greater than 100 angstroms. In one embodiment, the pellet or support material may have a mean pore diameter greater than about 120 angstroms.

Any suitable material can be used as a support material in the Fischer-Tropsch process. These include metal oxides, such as alumina, silica, zirconia, magnesium, or combinations of these materials. Preferably, alumina is used as a support material to make a supported catalyst.

The catalytically active metals, which are included with or dispersed to the support material, include substances which promote the production of diesel fuel in the Fischer-Tropsch reaction. For example, these metals include cobalt, iron, nickel, or any combinations thereof. Various promoters may be also added to the support material. Examples of promoters include ruthenium, palladium, platinum, gold, nickel, rhenium, iridium, silver, osmium or any combinations thereof.

The catalyst support ideally has a crush strength of between about 3 lbs/mm and 4.5 lbs/mm and a BET surface area of greater than 150 m$^2$/g. This combination of variables is unique. Conventional high surface area supports have an average pore diameter less than 100 angstroms.

Supports that have been engineered to have a large average pore volume greater than 120 angstroms will have surface area much lower than 150 m$^2$/g and crush strength will be below 2 lbs/mm despite additional calcination or heat treatment. Achieving the above combination of variables is unique in the art. This is achieved with the addition of a structural stabilizer that provides additional crystallinity (for example silicon or silica oxide) and thus more strength upon heat treatment.

The active metal distribution on the support is ideally between about 2% and about 10%, preferably about 4%. The active metal dispersion is the fraction of the atoms on the catalyst surface that are exposed as expressed by:

$$D = N_S/N_T,$$

where D is the dispersion, $N_S$ is the number of surface atoms, and $N_T$ is the total number of atoms of the material. Dispersion increases with decreasing crystallite size.

In one embodiment, a supported catalyst includes cobalt, iron, or nickel deposited at between about 5 weight % and 30 weight % on gamma alumina, more typically about 20 weight % on gamma alumina, based on the total weight of the supported catalyst. Also, the supported catalyst formulation includes selected combinations of one or more promoters consisting of ruthenium, palladium, platinum, gold nickel, rhenium, and combinations in about 0.01-2.0 weight % range, more typically in about 0.1-0.5 weight % range per promoter. Production methods of the catalyst include impregnation and other methods of production commonly used in the industry and are described in the art.

Fischer-Tropsch supported catalysts are generally used in either a fixed bed or a slurry bed reactor. In a fixed bed reactor, the supported catalysts are packed within tubes or may be spread across a tray or packed into a number of channels, or any other fixed bed reactor design whereby the reaction gas is evenly distributed and flows over the catalyst in the bed. In one embodiment, the catalyst is loaded in a multi-tubular fixed bed reactor, with each tube in a shell design with one inch diameter. In one embodiment, the catalyst is reduced in-situ in the multi-tubular fixed bed reactor at temperatures below 550 F. Typical Fischer-Tropsch catalysts are reduced ex-situ (before loading into the reactor) and at temperatures above 600 F, and can be as high as 400 C (750 F). The use of a unique low temperature, in-situ reduction procedure is unique in the art with this catalyst.

The operating parameters of the supported catalyst are selected to achieve the desired selectivity of diesel fuel. The Fischer-Tropsch reaction in embodiments of the invention is typically kept at pressures below about 250 psi, preferably at around 200 psi. The Fischer-Tropsch reaction is operated at temperatures between about 350 F and 460 F, more typically around 410° F.

FIG. 2 also shows a quad-lobe support (250) with lobes of different sizes (260, 270, 280 and 290). Lobes 270 and 290 denote the longer lobes and lobes 260 and 280 denote the shorter lobes. This type of support allows for more efficient catalyst bed packing, better pressure drop characteristics, and higher diesel fuel to wax production ratios using the invention described herein.

Figure 3:
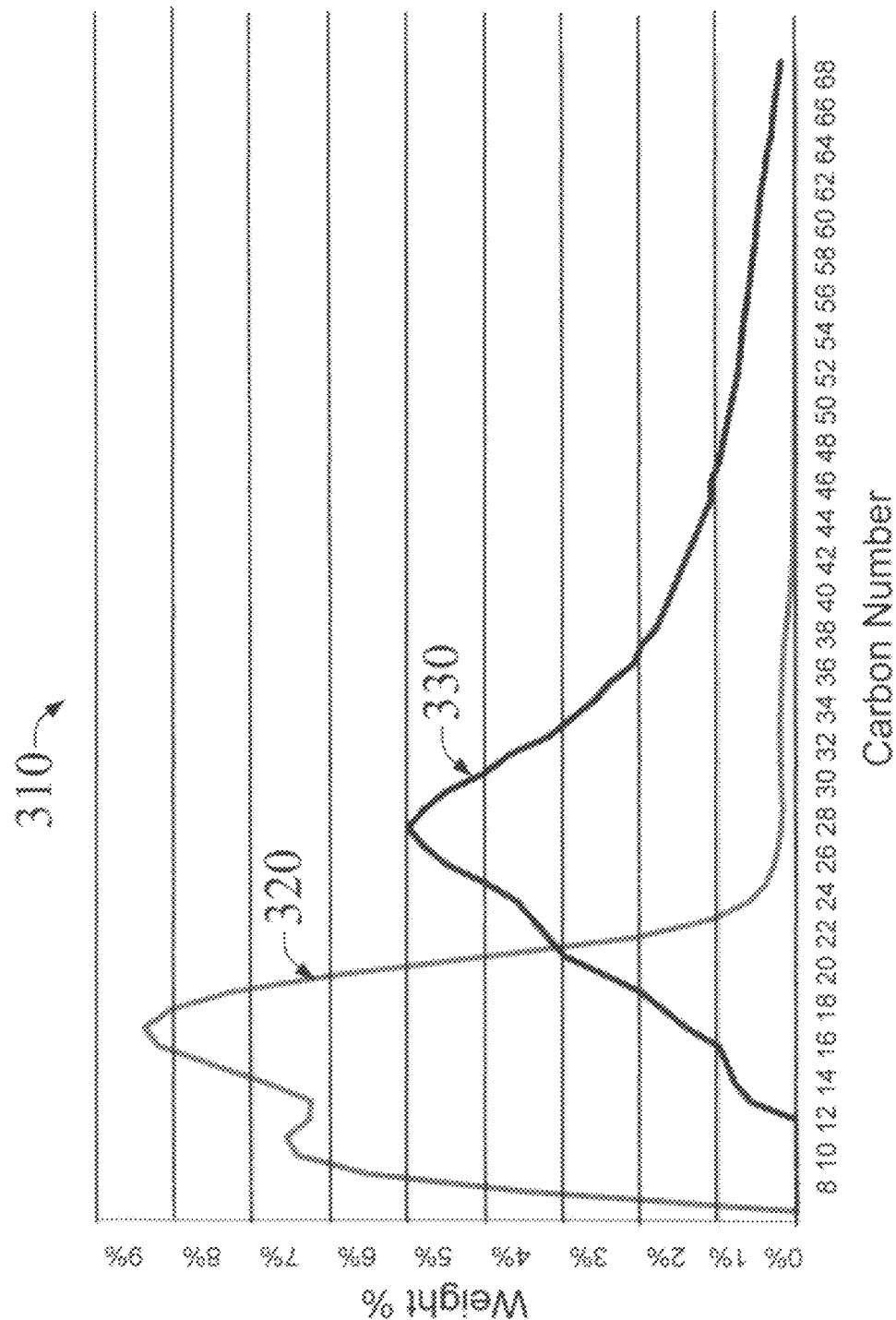
FIG. 3 shows a comparison of the carbon number distribution of the product produced in accordance with embodiments of the invention and that produced by a traditional F-T catalytic process.

FIG. 3 (310) shows a $C_8$-$C_{24}$ product distribution (320) resulting from one implementation of the invention described herein of a catalyst operating at 200 psi and 410 F when compared to the product produced from a traditional F-T catalyst and associated ratios (330).

In a typical Fischer-Tropsch reaction, the catalytic reaction is performed at a pressure of around 400-500 psi. Under the traditional Fischer-Tropsch reaction, the ratio of diesel fuel to wax produced from a syngas is typically about 1 to 1. By contrast, when supported catalysts and operating conditions in accordance with one implementation of the invention are used, the reaction favors the production of a diesel fuel. FIG. 3 shows results of one implementation (320) where the ratio of diesel fuel to wax production is about 8 to 1. In other implementations, the ratio of diesel fuel to wax production may be higher. The ratio of diesel fuel to wax production typically ranges between about 5 to 1 and about 30 to 1.

Figure 4:
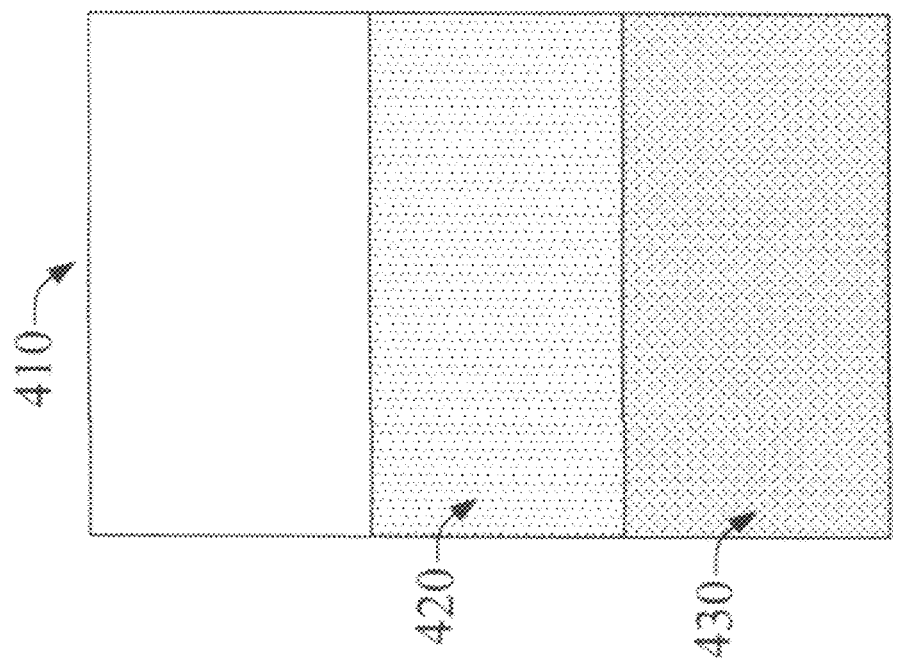
FIG. 4 illustrates the liquid product fractions that are produced from condensing the product gas.

FIG. 4 shows the product fraction when this product fraction is condensed out in a single knock out vessel (410). Diesel fraction 420 and water fraction with entrained wax particles (430) can be separated by various methods. This mixture of condensable products is unique in the art. Exemplary methods include separation by decanting, distillation, and separation by membranes.

Figure 5:
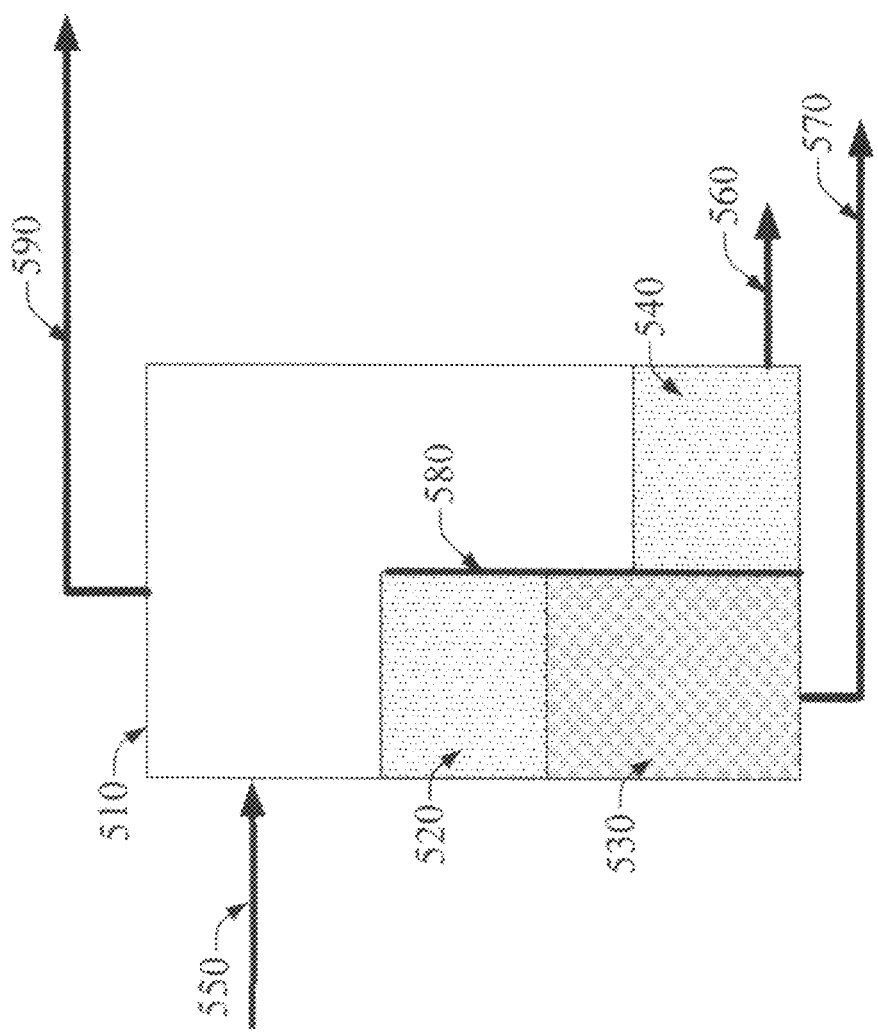
FIG. 5 shows the design of a unique knock out vessel used to maximize the diesel fuel fraction.

FIG. 5 shows a schematic diagram (510) of a single knock out vessel that is used to condense out diesel fuel, water, and wax fractions wherein the wax fraction stays entrained in the water fraction for ease of separation from the diesel fuel and an internal vane is used to separate out the diesel fuel fraction by controlling the liquid levels on each side of the vane. This separator may be operated at temperatures ranging from 40 F to 110 F, more typically at 60 F. Product gas is ideally brought into the separator through inlet 550 within 0 to 50 degrees F. lower than the operating temperature of the reactor, more typically 15 degrees F.

Diesel fuel will spill over onto the right side (540) of vane 580 and a separated water/wax fraction (530) will sit below diesel fuel 520 on the left side of the vane. The liquid levels are controlled on each side of the vane by draining the respective product (outlet 560 for diesel fuel and outlet 570 for wax/water). Unconverted gas and light gas fractions will exit the top of the reactor through gas outlet 590.

Optionally, the diesel fuel fraction can be further processed to improve its cold flow properties (e.g., cold pour properties). In some market areas, it is desired that the low temperature properties of the diesel fuel are improved to optimize the performance of diesel fueled vehicles in cold weather.

In one embodiment, the diesel fuel fraction can be further reacted with a catalyst which promotes isomerization (e.g., converting from the normal paraffins to iso paraffins) or hydrogenation of the diesel fuel. The diesel fuel fraction from the single knock-out vessel can be reacted with an isomerization or hydrogenation catalyst, such as a platinum promoted tungstate-modified zirconia, in a reactor. An example of a suitable reactor is a trickle bed reactor.

The isomerization or hydrogenation reactor is generally operated at pressures in the range of about 100 psi to about 400 psi, preferably at about 150 psi. The reactor is kept at a temperature between about 300° F. to about 600° F., preferably at about 425° F. Thermal cracking of the F-T products may also be employed either alone or in combination with the isomerization process.

In another embodiment, a cold flow improver may be blended with the diesel fuel fraction to improve cold flow properties of the diesel fuel. Cold flow improvers are added to diesel fuel in an amount from 100 to 5,000 ppm to lower the pour point and freezing point properties. These pour point depressants typically consist of oil-soluble copolymers such as ethylene vinyl acetate copolymers (EVA), esters of styrene-malefic anhydride copolymers, polymethyl-methacrylate copolymers and alkyl-methacrylate copolymers.

In another embodiment, the water with entrained wax particles is recycled back to the syngas production step, which may include gasification, reforming, or other syngas production methods. In addition, unconverted gas and light gas fractions may also be recycled. The water with wax particles and the unconverted gas and light gas fractions is used as an input to the syngas production process and can act as a valuable hydrogen and carbon source that improves efficiency of the overall process by using this product steam to create additional syngas:

EXAMPLE #1

Supported catalysts are prepared using an incipient wetness procedure whereby cobalt and promoter metals are impregnated on a gamma alumina, quad-lobed support with a mean effective pellet radius of 0.25 mm and a mean pore diameter of 130 Angstroms. The surface area of the catalyst is 110 m2/g as measured by BET/$N_2$ physisorption technique. The crush strength of the catalyst is 4 lbs/mm. Drying and calcination steps are used in the production process to produce a catalyst with 20 wt % cobalt and 0.3 wt % platinum promoter. Following the production of the supported catalysts, the supported catalysts are loaded in a multi-tubular fixed bed reactor of a tube in shell design with 1" (2.54 cm) diameter tubes. The catalyst is reduced with hydrogen at 75 psig and at a temperature less than 550° F. which are operating conditions that can be achieved in a fixed bed reactor that can be manufactured inexpensively.

In an alternative embodiment, the catalyst is reduced with a syngas feed with a high $H_2$/CO ratio under the same conditions. Reduction with syngas (instead of $H_2$) reduces commercial operating costs, especially in remote areas where smaller, distributed plants are sited. While in-situ reduction is highlighted in this example, other reduction procedures, including ex-situ options, can be used.

Following reduction, the supported catalysts are contacted with syngas with $H_2$ and CO at a ratio of 2.05:1.0 ($H_2$:CO), at a pressure of 200 psi, and at a temperature of 410° F.

Following the catalytic conversion step, the diesel fuel fraction and the wax and water fraction are separated out from the light hydrocarbon gases and unreacted CO and $H_2$ in a single knock out vessel at temperatures below 80° F. The separated liquid product fraction includes a diesel fuel fraction on top and a water fraction on the bottom that includes entrained wax particles. A separator vessel with an internal vane is used to separate the diesel fuel fraction from the water with entrained wax particles.

The catalyst system under these operating conditions produces a diesel fuel to wax ratio of 8:1 wt %. The diesel fuel can be ideally used as a diesel fuel blendstock providing a petroleum derived diesel fuel with an improvement in cetane, reduction in sulfur, and in some cases (based on the method of syngas production) can be used as a low carbon blendstock. The diesel fuel can also be blended with middle distillate fuel produced from hydroprocessing of F-T wax.

The water with entrained wax particles as well as unconverted gas and light gas fractions is recycled back to the syngas production process and is used as an input to create additional syngas, thus improving overall conversion efficiencies of the integrated system.

EXAMPLE #2

In this example, improved cold flow properties of the diesel fuel fraction are desired. The same catalyst system and processes are used as described above in Example #1. Following the catalyst synthesis process, the diesel fuel fraction is contacted with a catalyst that performs isomerization under mild operating conditions, while minimizing cracking functions. In this example, the catalyst used is a platinum promoted tungstate-modified zirconia.

In this example, a trickle bed reactor is used; however, other known reactors can be used as well. The reactor is operated in a pressure range of about 100 psi to about 400 psi, ideally at 150 psi in a temperature range of about 350° F. to about 600° F., preferably at 425° F. The $H_2$/diesel fuel molar ratio is estimated using $C_{16}$ (hexadecane) as an average compound of the diesel fuel and the $H_2$/n-$C_{16}$ ratio is in the range of 1.5-5, preferably equal to 2 (therein requiring 22 standard cubic feet of $H_2$ per gallon of n-$C_{16}$ product to be isomerized).

The output product converts up to about 75% of the normal paraffins to iso paraffins with a high selectivity, thus improving cold pour properties of the diesel fuel fraction, if required in some market areas.

EXAMPLE #3

The cold flow properties of a diesel fuel fraction are improved by splash blending the diesel fuel fraction with a cold flow improver. The same catalyst system and processes are used as described above in Example #1. Following the catalyst synthesis process, the diesel fuel fraction is splash blended with a cold flow improver that is blended at 2000 ppm and consists of alkyl-methacrylate copolymers.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more."

All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

All publications, patents and patent applications cited herein are hereby incorporated by reference for all purposes in their entirety.

What is claimed is:

1. A process for the production of a hydrocarbon mixture comprising;
    a catalyst in a fixed bed reactor that is reduced in-situ at a temperature below 550 F,
    reacting a feed gas that contains hydrogen and carbon monoxide with a catalyst having,
        a pore diameter greater than 120 angstroms and;
        an effective pellet radius of less than 600 microns and;
        a crush strength of greater than 3 lbs/mm and;
        a BET surface area of greater than 110 m2/g
    producing a product stream comprising light gases, diesel fuel and a wax from reacting the feed gas with the supported catalyst, wherein a ratio of the diesel fuel to wax in the product stream is greater than about 5 to 1 wt %.

2. The process of claim 1, wherein a ratio of the diesel fuel to wax in the product stream is greater than about 12 to 1 weight percent.

3. The process of claim 1, wherein the operating condition comprises operating at pressures below about 250 psi.

4. The process of claim 1, wherein the supported catalyst comprises greater than about 5 weight percent of cobalt, iron, nickel, or a combination thereof deposited on a support, based on a total weight of the supported catalyst.

5. The process of claim 1, wherein the support is a quad-lobe support with two shorter and two longer lobes.

6. The process of claim 1, wherein the supported catalyst further comprises about 0.01 weight percent to about 2.0 weight percent of a promoter selected from the group consisting of ruthenium, palladium, platinum, rhenium, gold, silver, osmium, iridium, and a combination thereof.

7. The process of claim 1, wherein the diesel fuel is blended with a hydrocarbon fuel that is produced from hydroprocessing of F-T waxes.

8. A process for the production of a hydrocarbon mixture comprising;
    a catalyst in a fixed bed reactor that is reduced in-situ at a temperature below 550 F,
    reacting a feed gas that contains hydrogen and carbon monoxide with a supported catalyst,
    producing a product stream comprising light gases, diesel fuel and a wax from reacting the feed gas with the supported catalyst wherein a ratio of the diesel fuel to wax in the product stream is greater than about 5 to 1 wt %,
    further comprising introducing the product stream from the reactor into a single vessel and condensing the product stream into two liquid fractions in the single vessel, wherein a top fraction contains the diesel fuel and a bottom fraction contains the wax entrained in water.

9. The process of claim 7, further comprising separating light hydrocarbon gases and unreacted carbon monoxide and hydrogen gas, from the two fractions in the single vessel at a temperature below about 80° C.

10. The process of claim 7, wherein the product gas is brought into the separator at no less than 15 degrees F. below operating conditions of the catalytic reactor.

11. The process of claim 7, wherein the diesel fuel fraction is separated from the wax entrained water fraction by using a vane within the single separation vessel and controlling the liquid levels on each side of the vane to remove the diesel fuel fraction.

12. The process of claim 1, further comprising blending a cold flow improver to the diesel fuel.

13. The process of claim 1, further comprising reacting the diesel fuel with a platinum-promoted catalyst to isomerize the diesel fuel.

14. The process of claim 1, further comprising thermal cracking of the product gas stream.

15. A process for the production of a hydrocarbon mixture comprising;
    a catalyst in a fixed bed reactor;
    reacting a feed gas that contains hydrogen and carbon monoxide with a catalyst having,
        a pore diameter greater than 120 angstroms and;
        an effective pellet radius of less than 500 microns and;
        a crush strength of greater than 3 lbs/mm and;
        a BET surface area of greater than 110 m2/g;

producing a product stream comprising light gases, diesel fuel and a wax from reacting the feed gas with the supported catalyst;

wherein a ratio of the diesel fuel to wax in the product stream is greater than about 5 to 1 wt %;

wherein the operating condition comprises operating at pressures below about 250 psi.

16. The process of claim 15, wherein the support is a quad-lobe support with two shorter and two longer lobes.

17. The process of claim 15, further comprising introducing the product stream from the reactor into a single vessel and condensing the product stream into two liquid fractions in the single vessel, wherein a top fraction contains the diesel fuel and a bottom fraction contains the wax entrained in water.

18. The process of claim 13, further comprising separating light hydrocarbon gases, unreacted carbon monoxide and hydrogen gas, from the two fractions in the single vessel at a temperature below about 80° C.

19. The process of claim 18, wherein the product gas is brought into the separator at no less than 15 degrees F. below operating conditions of the catalytic reactor.

20. The process of claim 15, wherein the reactant gas is converted to products in one pass through the reactor.

21. The process of claim 17, wherein the wax entrained in water fraction is recycled back to the syngas generation step.

22. The process of claim 8, wherein the wax entrained in the water fraction is recycled back to the syngas generation step.

23. The process of claim 17, wherein the unconverted carbon monoxide and hydrogen and light gas fractions are recycled back to the syngas generation step.

24. The process of claim 8, wherein the unconverted carbon monoxide and hydrogen and light gas fractions are recycled back to the syngas generation step.

\* \* \* \* \*